(12) United States Patent
Shibayama et al.

(10) Patent No.: US 11,712,739 B2
(45) Date of Patent: Aug. 1, 2023

(54) METAL POWDER PRODUCTION APPARATUS

(71) Applicant: Mitsubishi Heavy Industries, Ltd., Tokyo (JP)

(72) Inventors: Takashi Shibayama, Tokyo (JP); Shigenobu Eguchi, Tokyo (JP); Shinya Imano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 815 days.

(21) Appl. No.: 16/696,553

(22) Filed: Nov. 26, 2019

(65) Prior Publication Data

US 2020/0171579 A1 Jun. 4, 2020

(30) Foreign Application Priority Data

Nov. 29, 2018 (JP) .................. 2018-223420

(51) Int. Cl.
*B22F 9/08* (2006.01)

(52) U.S. Cl.
CPC ........ *B22F 9/082* (2013.01); *B22F 2009/088* (2013.01); *B22F 2009/0888* (2013.01); *B22F 2009/0892* (2013.01)

(58) Field of Classification Search
CPC ........................ B22F 9/082; B22F 2009/0888
See application file for complete search history.

(56) References Cited

U.S. PATENT DOCUMENTS 5,171,358 A * 12/1992 Mourer .................. B22F 9/08
266/227

2015/0059526 A1 3/2015 Vikner et al.
2021/0101211 A1 * 4/2021 Memoli .................. B22F 9/082

FOREIGN PATENT DOCUMENTS

| CN | 108015296 A | | 5/2018 |
|---|---|---|---|
| JP | 60255906 A | * | 12/1985 |
| JP | 2002-206104 A | | 7/2002 |
| JP | 2009035801 A | * | 2/2009 |
| JP | 2012-046777 A | | 3/2012 |
| JP | 2012201940 A | * | 10/2012 |
| JP | 2016-211027 A | | 12/2016 |

OTHER PUBLICATIONS

Extended European Search Report dated Feb. 20, 2020 for the European Patent Application No. 19210542.7.

* cited by examiner

*Primary Examiner* — Anthony J Zimmer
*Assistant Examiner* — Sean P. O'Keefe
(74) *Attorney, Agent, or Firm* — Volpe Koenig

(57) ABSTRACT

A metal powder production apparatus capable of easily preventing an oxide in a molten metal from entering a liquid nozzle is provided. The metal powder apparatus includes a first crucible heating and melting a melting material to generate molten metal, a first heating device heating and melting the metal in the first crucible, a stopper opening and closing a first opening provided on the bottom surface of the first crucible, an introduction pipe having one end connected to the first opening of the first crucible and leading a molten metal in the first crucible to the outside of the first crucible, a second crucible receiving the molten metal flowing out of the introduction pipe, a second heating device heating the second crucible, and a liquid nozzle provided on the bottom surface of the second crucible.

9 Claims, 6 Drawing Sheets

BEFORE MELTING

DURING TAPPING

METAL POWDER PRODUCTION APPARATUS

BACKGROUND OF THE INVENTION

1. Field of the Invention

The present invention relates to a metal powder production apparatus for producing a metal powder in the form of fine particles by causing a high-pressure gas fluid to collide with molten metal flowing down from a liquid nozzle.

2. Description of the Related Art

Methods for producing particulate metal (metal powders) from molten metal include atomization method including gas atomization method and water atomization method. In the gas atomization method, a molten metal is flowed down from a liquid nozzle placed in a lower portion of a melting chamber storing molten metal, and an inert gas is blown onto the molten metal from a plurality of gas jet nozzles arranged around the liquid nozzle. The flow of the molten metal from the liquid nozzle is divided by the inert gas flow from the gas jet nozzle to form a large number of fine metal droplets, which fall in the spray chamber and solidify while being spheroidized by the surface tension. As a result, the spherical metal powder is collected in the collection hopper at the bottom of the spray chamber.

For example, JP-2016-211027-A discloses an apparatus for producing metal powder, which has a melting chamber having an induction melting furnace and a crucible (a tundish) therein, a spray chamber located at a lower portion thereof, an atomizing nozzle (a liquid nozzle and gas jet nozzles) for dropping the molten metal in the crucible into the spray chamber while blowing an inert gas, a gas inlet and a gas outlet for performing a gas replacement in the spray chamber, and a second gas inlet for providing a gas for making the inside of the spray chamber into an oxidizing atmosphere and/or a nitriding atmosphere.

SUMMARY OF THE INVENTION

In recent years, there has been an increasing need for metal powders having a particle diameter smaller than that have been previously required for the atomization method, for the variety of use such as a material for metal three-dimensional printers which form a metal of a desired shape by stacking a large amount of metal particles. The particle size of metal powders used for powder metallurgy, welding, and the like has been, for example, approximately 70 to 100 μm. But the particle size of metal powders used for three-dimensional printers is very fine, for example, approximately 20 to 50 m. Therefore, the minimum hole diameter of the liquid nozzle of the atomizer for producing this type of fine metal powder becomes very small, for example, 3 mm or less.

It is important that the metal powder has a high purity because it is melted by a high-energy heat source for the forming process by a metal three-dimensional printer. However, the molten metal (liquid) in the crucible contains, as impurities, oxides generated during the heating and melting process of the metal (molten material) even in a vacuum atmosphere or an inert gas atmosphere. Since the oxide is lighter than the liquid, it collects in the vicinity of the liquid surface of the liquid. For example, when a molten metal is poured into a crucible by tilting an induction melting furnace as disclosed in JP-2016-211027-A, oxides floating on the liquid surface of the molten metal are mixed into the crucible, or an oxide attached to the inner wall of the crucible is separated by a vortex flow generated in the vicinity of the inner wall of the crucible at the time of pouring. If this oxide is introduced into the spray chamber together with the molten metal (liquid) through the liquid nozzle and contained in the metal powder, the purity of the metal powder may be lowered and the purity may not satisfy the requirement of the user. Further, for the above reason, the minimum hole diameter of the liquid nozzle is very small and in such structure the oxide is easily clogged. If the oxide is clogged in the liquid nozzle, it is necessary to replace the liquid nozzle, or in some cases, to replace the crucible itself connected to the liquid nozzle, which may reduce the production efficiency of the metal powder.

The present invention has been made in view of the above circumstances, and an object thereof is to provide a metal powder production apparatus capable of easily preventing an oxide in a molten metal from entering a liquid nozzle.

The present application includes a plurality of means for solving the above-mentioned problem, and includes: a first crucible capable of receiving a metal before melting; a first heating device for heating and melting the metal in the first crucible; a stopper for opening and closing a first opening provided on a bottom surface of the first crucible; an introduction pipe having one end connected to the first opening of the first crucible, the introduction pipe guiding a molten metal in the first crucible to outside of the first crucible; a second crucible for receiving molten metal flowing out of the introduction pipe; a second heating device for heating the second crucible; a liquid nozzle provided on a bottom surface of the second crucible, and a plurality of gas jet nozzles arranged around the liquid nozzle and jetting a gas fluid to the molten metal flowing down from the liquid nozzle.

According to the present invention, it is possible to prevent oxides in the molten metal from entering the liquid nozzle, and it becomes possible to efficiently produce the metal powder of high purity.

DESCRIPTION OF THE PREFERRED EMBODIMENT

Embodiments of the present invention will be described below with reference to the drawings.

—Overall Configuration of the Gas Atomizer—

Figure 1:
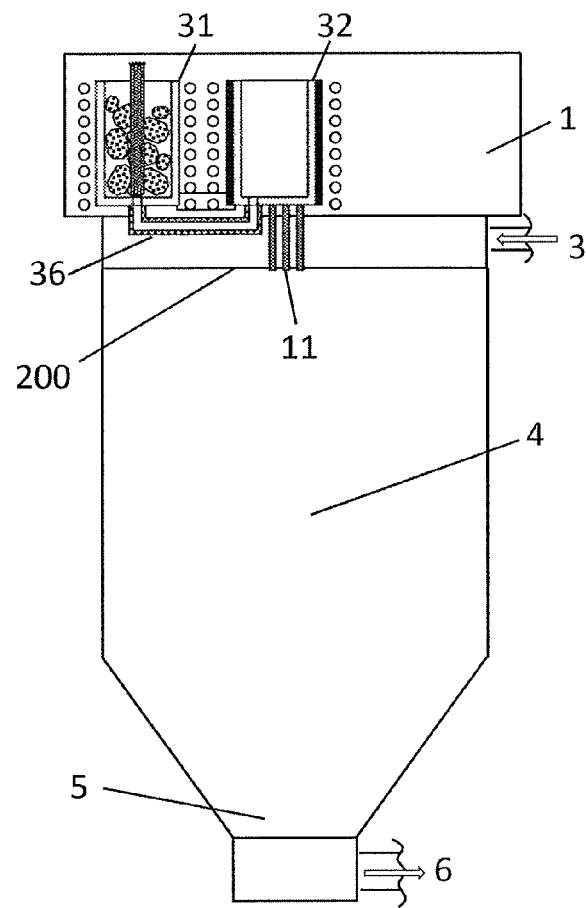
FIG. 1 is an overall configuration diagram of a gas atomizer that is a metal powder production apparatus.

FIG. 1 is an overall configuration diagram of a gas atomizer (a metal powder production apparatus) according to an embodiment of the present invention. The gas atomizer depicted in FIG. 1 includes: a melting chamber 1 in which a solid metal (a material to be melted) is heated and melted to generate molten metal (liquid); a metal spraying apparatus 200 that sprays a high-pressure gas (gas fluid) onto the liquid flowing down as a small stream from a melting chamber 1 via a plurality of liquid nozzles, described later, 11 to pulverize the molten metal into a large number of fine particles, and sprays the molten metal as a liquid spray; a jetting gas supply pipe (jetting fluid supply pipe) 3 for supplying a high pressure gas to the metal spraying apparatus 200; a spraying chamber 4 which is a container held in an inert gas atmosphere and in which a liquid metal in the form of fine particles sprayed from the metal spraying apparatus 200 is rapidly solidified while the metal is falling; and a collecting hopper 5 provided at the bottom of the spraying chamber 4 and collecting powdered solid metal which is solidified during its falling in the spraying chamber 4.

The melting chamber 1 houses a first crucible 31 capable of receiving the metal before melting (the material to be melted) and a second crucible 32 for receiving the molten metal heated and melted in the first crucible. A plurality of liquid nozzles 11 are provided on the bottom surface of the second crucible 32, and molten metal (liquid) 7 received in the second crucible 32 can be introduced into the spray chamber 4 as a liquid stream 8. The melting chamber 1 is a sealed container (a sealed chamber) and is preferably maintained in a vacuum atmosphere or an inert gas atmosphere. Details of the configuration in the melting chamber 1 will be described later.

The spray chamber 4 is a cylindrical container having the same diameter in the upper part and the middle part, but in the lower part, it has a tapered shape in which the diameter becomes smaller as it approaches the collection hopper 5 for easy recovering of the metal powder with the collection hopper 5. Inert gas is discharged from the collecting hopper 5 as exhaust gas 6.

—Metal Spraying Apparatus 200—

Figure 2:
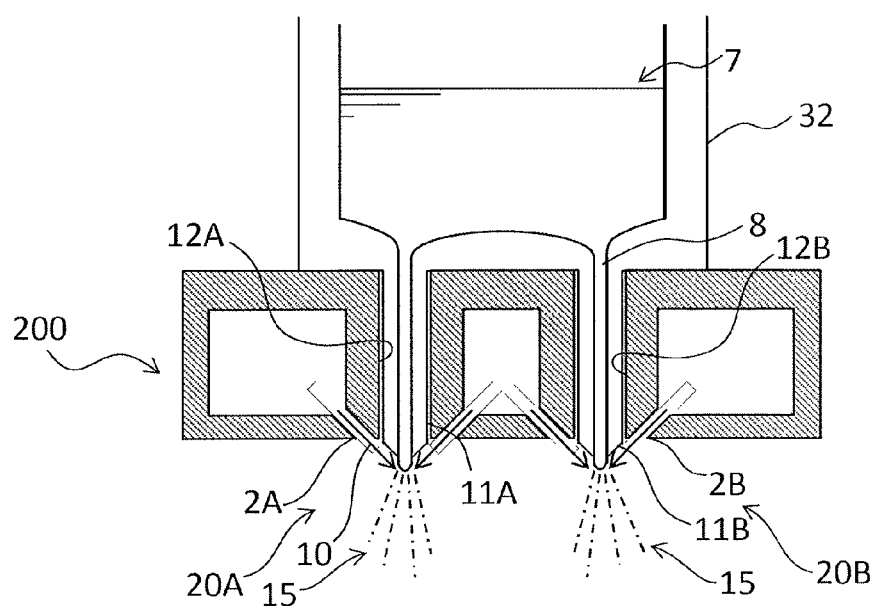
FIG. 2 is a cross-sectional view of the periphery of a metal spraying apparatus 200 of the gas atomizer of FIG. 1.

FIG. 2 is a cross-sectional view of the periphery of the metal spraying apparatus 200. It should be noted that the same reference numerals are assigned to the same parts as those in the preceding figures, and descriptions thereof are omitted. The same will be applied to subsequent figures.

The metal spraying apparatus 200 includes a plurality of spray nozzles 20A and 20B, hereinafter, also referred to as first spray nozzle 20A and second spray nozzle 20B, for liquid spraying of molten metal into the spray chamber 4 on the bottom surface thereof facing the spray chamber 4. Each of the plurality of spray nozzles 20A and 20B includes a single liquid nozzle 11 and a plurality of gas jet nozzles 2 arranged around the liquid nozzle 11. It should be noted that the illustration is merely an example, and the number of spray nozzles may be one or three or more.

The metal spraying apparatus 200 is provided with a first liquid nozzle insertion hole 12A and a second liquid nozzle insertion hole 12B that are two columnar through holes, and the first liquid nozzle 11A and the second liquid nozzle 11B are inserted into the first liquid nozzle insertion hole 12A and the second liquid nozzle insertion hole 12B, respectively. The molten metal in the melting chamber 1 flows down through the holes in the first and second liquid nozzles 11A and 11B as a liquid stream 8 to be discharged into the spray chamber 4. As the minimum inner diameter of the first liquid nozzle 11A and the second liquid nozzle 11B, for example, diameter of the orifice provided in the hole, contributing to a size of a diameter of a liquid column formed by the liquid introduced into the spray chamber 4, for example, 3 mm or less can be selected which is smaller than before.

The metal spraying apparatus 200 receives a high-pressure gas from an injection gas supply pipe 3 connected to a gas intake hole, not depicted, provided on a side surface of the metal spraying apparatus 200, and injects the supplied high-pressure gas as a directional injection gas jet 10 through a plurality of gas jet nozzles (injection holes) 2 provided on a circular bottom surface of the metal spraying apparatus 200. The plurality of gas jet nozzles 2 are arranged so as to draw a circle around the first liquid nozzle insertion hole 12A and the second liquid nozzle insertion hole 12B, respectively.

A gas fluid (a gas jet stream 10) is injected from the plurality of gas jet nozzles 2 constituting each of the spray nozzles 20A and 20B, to the molten metal (the liquid stream 8) flowing down from the liquid nozzle 11. The liquid stream 8 collides with an inverted conical fluid film formed by the high-pressure gas in the vicinity of the focal points of the plurality of gas jet nozzles 2, and is pulverized into a large number of fine particles 15. The metal, which has become fine liquid particles (fine particles 15) by the gas injection from the first and second gas jet nozzles 2A and 2B, is rapidly cooled and solidified while falling in the spray chamber 4, and is collected as a large number of metal powders with the collection hopper 5.

First Embodiment

Hereinafter, the details of the configuration of the melting chamber 1 in the gas atomizer according to the first embodiment of the present invention will be described with reference to the drawings.

Figure 3:
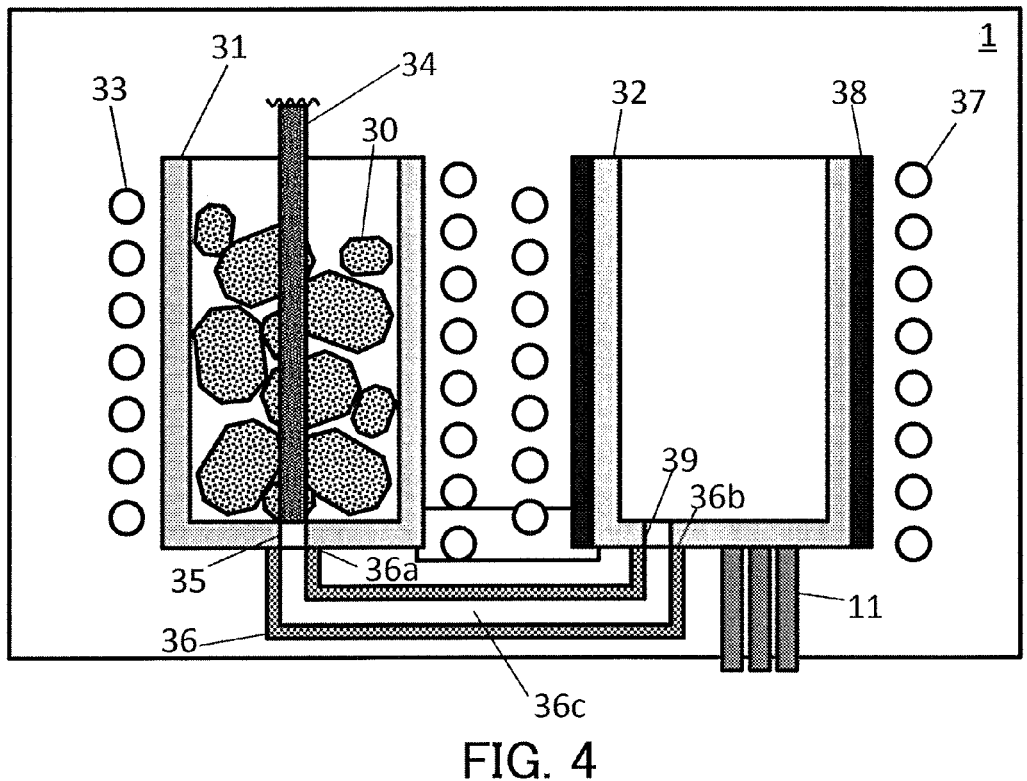
FIG. 3 is an internal configuration diagram of a melting chamber 1 according to the first embodiment, and depicts a state before melting a material to be melted 30 in a first crucible 31.

FIG. 3 is an internal configuration diagram of the melting chamber 1 according to the first embodiment, and depicts a state before melting the material to be melted (solid metal) 30 in the first crucible 31.

As depicted in this figure, inside the melting chamber 1, a first crucible 31 which is a heat-resistant container for heating and melting the received material (the metal) to be melted 30, a high-frequency heating coil (the first heating device) 33 which is wound around the first crucible 31 and heats and melts the material to be melted (the metal) 30 in the first crucible 31, a stopper 34 which opens and closes the first opening 35 which is an opening (a through hole) provided in the bottom surface of the first crucible 31, an introduction pipe 36 having one end (a first end portion 36a) connected to the first opening 35 of the first crucible 31 and being a pipe for guiding the molten metal in the first crucible 31 to the outside of the first crucible 31, a second crucible 32 which is a heat-resistant container for receiving the molten metal flowing out of the introduction pipe 36, and an indirect heating carbon (a conductive material) 38 which is positioned around the second crucible 32, a high-frequency heating coil (a second heating device) 37 that is wound around the indirect heating carbon 38 and heats the second crucible 32 indirectly by heating the indirect heating carbon 38, and a plurality of liquid nozzles 11 provided on the bottom surface of the second crucible 32 to allow molten metal to flow down into the spray chamber 4, are provided.

The upper part of the first crucible 31 and the second crucible 32 is opened in the melting chamber 1, and the pressure in the first crucible 31 and the second crucible 32 is the same as that in the melting chamber 1.

The bottom surface of the second crucible 32 is provided with a second opening 39 connected to the other end (a second end portion 36b) of the introduction pipe 36, and the second crucible 32 can receive the molten metal in the first crucible 31 through the introduction pipe 36. The bottom surface levels of the first crucible 31 and the second crucible 32, that is, the levels of the first opening 35 and the second opening 39 are the same.

The high-frequency heating coil (the first heating device) 33 and the high-frequency heating coil (the second heating device) 37 are connected to an AC power source. When the high-frequency heating coils 33 and 37 are energized, an eddy current is generated in the vicinity of the surface of the metal in the first crucible 31 or carbon 38, that are the heating objects, and at that moment the Joule heat is generated to heat the heating objects. At this time, the second crucible 32 is indirectly heated by the heated carbon 38. In the present embodiment, carbon 38 is used as the heating object in the high-frequency heating coil (the second heating device) 37, but other metals and the like can be substituted as long as they are conductive materials.

The stopper 34 is a rod-shaped heat-resistant member extending in the vertical direction, and a drive mechanism, not depicted, for moving the stopper 34 up and down is attached to the stopper 34. When the stopper 34 is moved downward by the drive mechanism to bring the tip end (the lower end) of the stopper 34 into contact with the first opening 35 of the first crucible 31, the first opening 35 is closed and the outflow of the liquid in the first crucible 31 can be stopped. Conversely, when the stopper 34 is moved upward and the tip end of the stopper 34 is separated from the first opening 35, the first opening 35 is opened and the liquid can be introduced into the introduction pipe 36.

The introduction pipe 36 is a substantially U-shaped pipe having a first end portion 36a connected to the first opening 35 of the first crucible 31 and a second end portion 36b connected to the second opening 39 of the second crucible 32 at respective ends thereof. The level of a lowest level portion (the lowest portion) 36c in the flow path in the introduction pipe 36 is lower than the level of the second end portion 36b connected to the second opening 39 of the second crucible 32. The level of the flow path of the introduction pipe 36 of the present embodiment is monotonously lowered from the first end portion 36a to the lowest portion 36c, and then monotonously increases from the lowest portion 36c to the second end portion 36b. To connect the introduction pipe 36 to the first crucible 31 and the second crucible 32, an adhesive can be used for example.

In order to prevent solidification of the liquid 7, a conductive material such as carbon may be arranged around the introduction pipe 36, and the introduction pipe 36 may be preheated by heating the conductive material with a high-frequency heating coil.

Operation and Effects

In the metal powder production apparatus configured as described above, when producing the metal powder, firstly the liquid 7 is generated in the melting chamber 1 for flowing down from the plurality of liquid nozzles 11. Details thereof will be described below.

Figure 4:
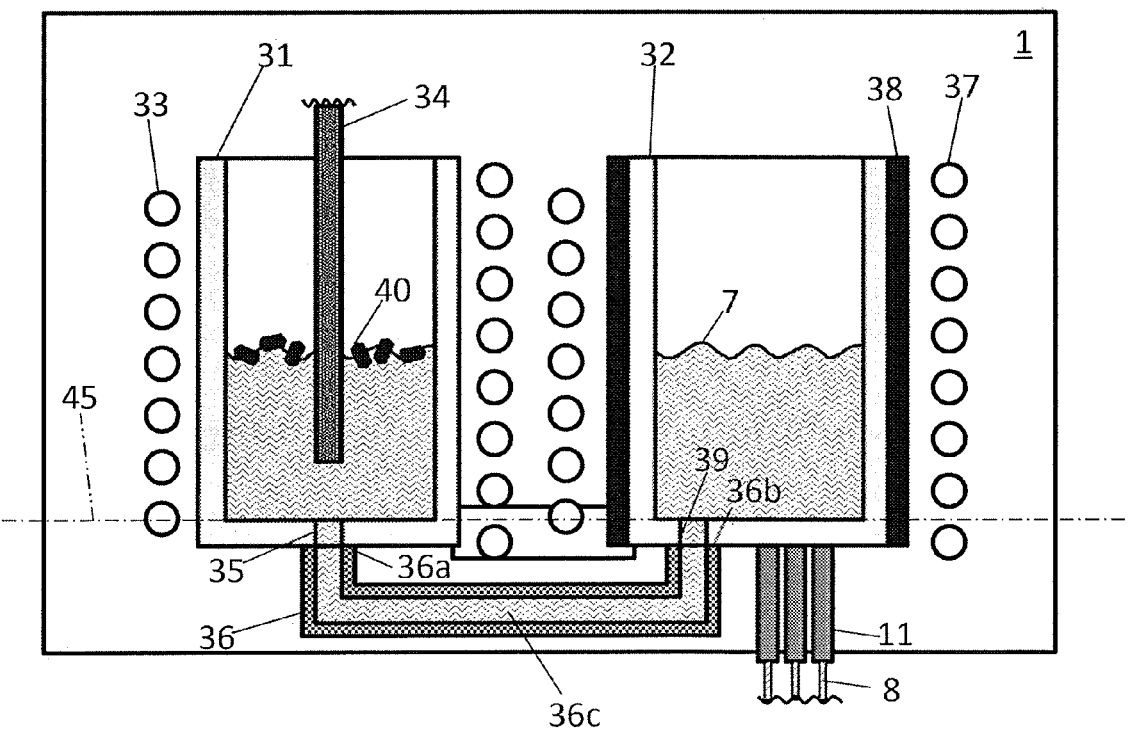
FIG. 4 is an internal configuration diagram of the melting chamber 1 according to the first embodiment, depicting a state in which a liquid 7 is being tapped from a second crucible 32.

First, in a state where the stopper 34 is lowered and the first opening 35 is closed, the melting material 30 is put into the first crucible 31, and the inside of the melting chamber 1 is maintained in a vacuum atmosphere or an inert gas atmosphere to flow an alternating current through the high-frequency heating coil 33. Subsequently, a magnetic field is generated around the melting material 30, the magnetic field induces an eddy current on the surface of the melting material 30, and the Joule heat generated at that time heats and melts the melting material 30 to generate the liquid 7. At this time, even if the melting chamber 1 is held in a vacuum atmosphere or an inert gas atmosphere, since a trace amount of oxygen is present, the oxide 40 is also generated together with the liquid 7 in the first crucible 31. However, since the oxide 40 is lighter than the liquid 7, the oxide 40 floats in the vicinity of the surface of the liquid 7 as depicted in FIG. 4 described later in a steady state in which the flow of the liquid 7 is stationary.

Further, similarly to the high-frequency heating coil 33 of the first crucible 31, an alternating current is also supplied to the high-frequency heating coil 37 to heat the carbon 38, and the second crucible 32 is preheated by the heat of the carbon 38.

When the generation of the liquid 7 in the first crucible 31 and the preheating of the second crucible 32 are completed, the liquid 7 in the first crucible 31 is introduced into the second crucible 32, and a tapping through the liquid nozzle 11 is started. The procedure at this time will be described with reference to FIG. 4. FIG. 4 is an internal configuration diagram of the melting chamber 1 according to the first embodiment, and depicts a state in which the liquid 7 is tapped from the second crucible 32.

When the stopper 34 is lifted to open the first opening 35, the liquid 7 in the first crucible 31 is introduced into the introduction pipe 36 through the first opening 35, and then introduced into the second crucible 32 through the first end portion 36a, the lowest portion 36c, and the second end portion 36b. At this time, the oxide 40 in the first crucible 31 is not introduced into the second crucible 32 because the oxide 40 is kept floating in the vicinity of the liquid surface of the liquid 7. Then, the liquid level of the liquid 7 in the second crucible 32 rises until it coincides with the liquid level of the liquid 7 in the first crucible 31. That is, the liquid levels of the liquid 7 in the first crucible 31 and the second crucible 32 are the same as depicted in FIG. 4. At the same time, the liquid 7 introduced into the second crucible 32 is tapped as a liquid stream 8 to the spray chamber 4 through a plurality of liquid nozzles 11 provided on the bottom surface of the second crucible 32.

Thereafter, if the tapping of the liquid 7 is continued, the liquid level of the liquid 7 in the first crucible 31 and the second crucible 32 is lowered while maintaining the same level, and when the liquid level coincides with the bottom surface 45 of the first crucible 31 and the second crucible 32, the tapping is terminated. That is, even if the stopper 34 is raised and kept away from the first opening 35, since the tapping of the liquid 7 stops when the liquid level of the liquid 7 coincides with the upper ends 45 of the first opening 35 and the second opening 39, the oxide 40 in the first crucible 31 does not pass through the introduction pipe 36 and enter the second crucible 32.

Therefore, according to the metal powder production apparatus of the present embodiment, it is possible to prevent the oxide 40 generated at the time of generation of the liquid 7 from being mixed into the second crucible 32 and the liquid nozzle 11. Thus, it is possible to prevent the contamination of impurities in the metal powder, and it is also possible to prevent the clogging the liquid nozzle 11 with the oxide 40. As a result, a high-purity metal powder can be efficiently produced.

Since the levels of the first crucible 31 and the second crucible 32 are the same in the present embodiment, the height increase of the melting chamber 1 can be suppressed as compared with other embodiments described later in that the levels of the crucibles 31 and 32 are different from each other.

Second Embodiment

Figure 5:
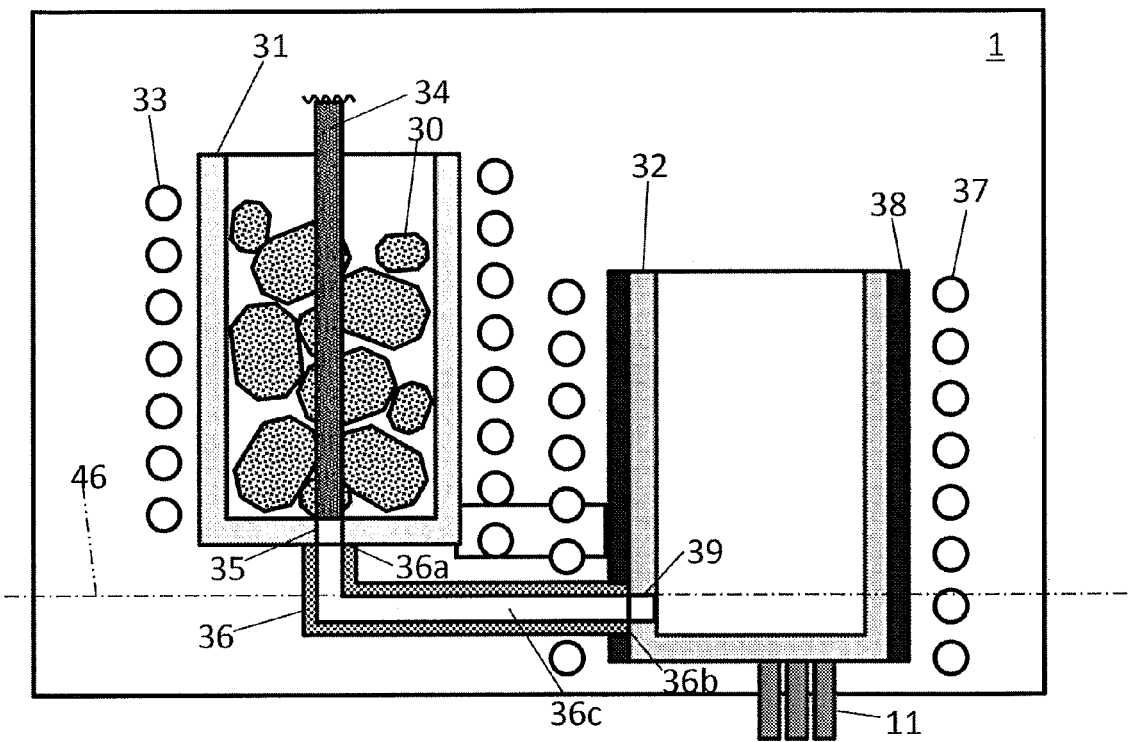
FIG. 5 is an internal configuration diagram of a melting chamber 1 according to the second embodiment.

FIG. 5 is an internal configuration diagram of the melting chamber 1 according to the second embodiment of the present invention, and depicts a state before melting the material to be melted 30 in the first crucible 31.

The present embodiment differs from the first embodiment mainly in (1) that the second end portion 36b of the introduction pipe 36 is connected to the second opening 39 provided on the side surface of the second crucible 32, and (2) that the level of the lowest portion 36c of the introduction pipe 36 is the same as the level of the second end portion 36b connected to the second opening 39 of the second crucible 32.

The introduction pipe 36 of the present embodiment is a substantially L-shaped pipe having a first end portion 36a connected to the first opening 35 of the first crucible 31 and a second end portion 36b connected to the second opening 39 of the second crucible 32 at respective ends thereof. The level of the flow path of the introduction pipe 36 of the present embodiment is monotonously lowered from the first end portion 36a to the lowest portion 36c, and thereafter becomes constant from the lowest portion 36c to the second end portion 36b. In other words, from the first end portion 36a towards the second end portion 36b, the introduction pipe 36 is a horizontal pipe having a predetermined length between a portion whose level first matches the lowest portion 36c (a bent portion of the pipe line) and the second end portion 36b.

When the metal powder production apparatus is configured as described above, it is also possible to prevent the oxide 40 in the first crucible 31 from entering the second crucible 32 until the liquid level of the liquid 7 in the first crucible 31 and the second crucible 32 is positioned above the level position 46 of the upper end of the second opening 39. That is, it is preferable to lower the stopper 34 while the liquid level of the liquid 7 is above the level position 46. However, even if the liquid level of the liquid 7 falls below the level position 46 of the upper end of the second opening 39, since the oxide 40 adheres to the inner wall surfaces of the first crucible 31, the first opening 35, and the straight pipe portions of the introduction pipe 36, as the liquid level of the liquid 7 falls, and further, it is predicted that the oxide 40 will stay in the horizontal pipe portion up to the second opening 39, the amount of the oxide 40 actually entering the second crucible 32 can be sufficiently reduced as compared with the prior art.

Therefore, also in the present embodiment, it is possible to prevent the oxide in the molten metal from entering the liquid nozzle, and it is possible to efficiently produce the metal powder of high purity.

Third Embodiment

Figure 6:
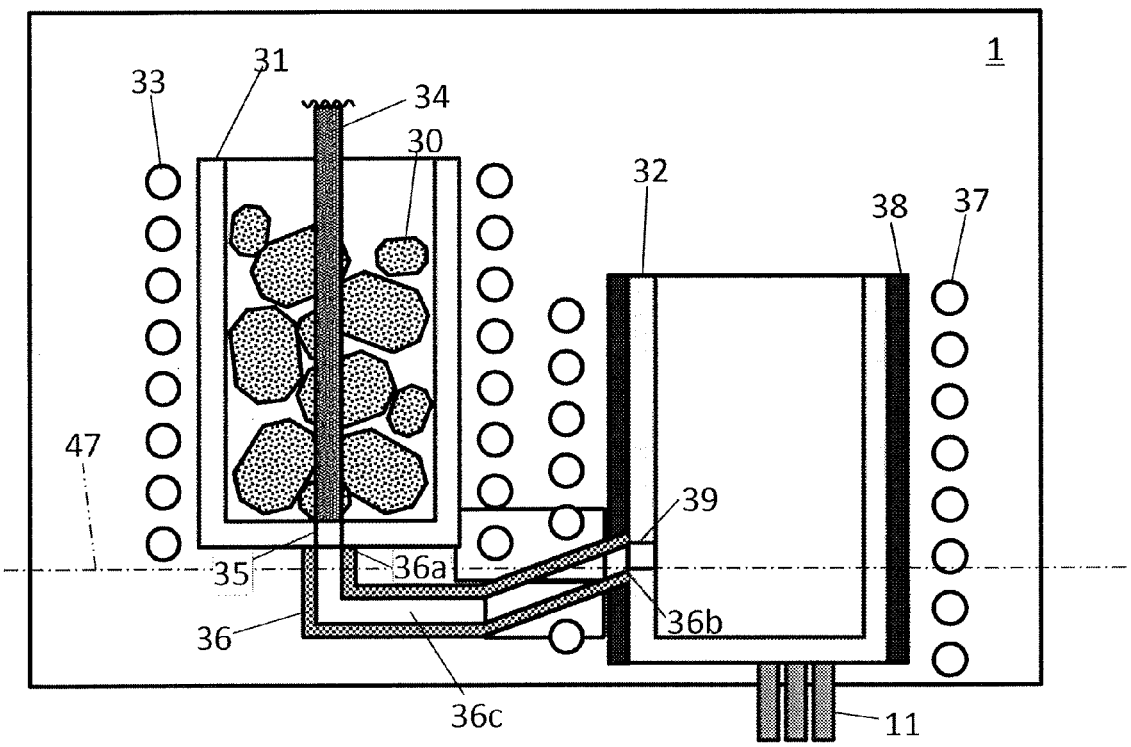
FIG. 6 is an internal configuration diagram of a melting chamber 1 according to a third embodiment.

FIG. 6 is an internal configuration diagram of the melting chamber 1 according to the third embodiment of the present invention, and depicts a state before melting the material to be melted 30 in the first crucible 31.

The present embodiment differs from the first embodiment in that (1) the second end portion 36b of the introduction pipe 36 is connected to the second opening portion 39 provided on the side surface of the second crucible 32.

In the present embodiment, the level of the flow path of the introduction pipe 36 is monotonously lowered from the first end portion 36a to the lowest portion 36c, and thereafter, from the lowest portion 36c to the second end portion 36b, the level is kept constant in the horizontal pipe portion and then monotonically rises.

In the case where the metal powder production apparatus is configured as described above, the tapping of the liquid 7 ends when the liquid level of the liquid 7 has dropped to the level position 47 of the lower end of the second opening 39 of the second crucible 32. That is, even if the stopper 34 is raised and kept away from the first opening 35, since the tapping of the liquid 7 stops when the liquid level of the liquid 7 coincides with the level position 47 of the lower end of the second opening 39, the oxide 40 in the first crucible 31 does not pass through the introduction pipe 36 and enter the second crucible 32.

Therefore, also in the metal powder production apparatus of the present embodiment, it is possible to prevent the oxide 40 generated at the time of generation of the liquid 7 from being mixed into the second crucible 32 and the liquid nozzle 11, and it is possible to efficiently produce the metal powder of high purity.

Fourth Embodiment

Figure 7:
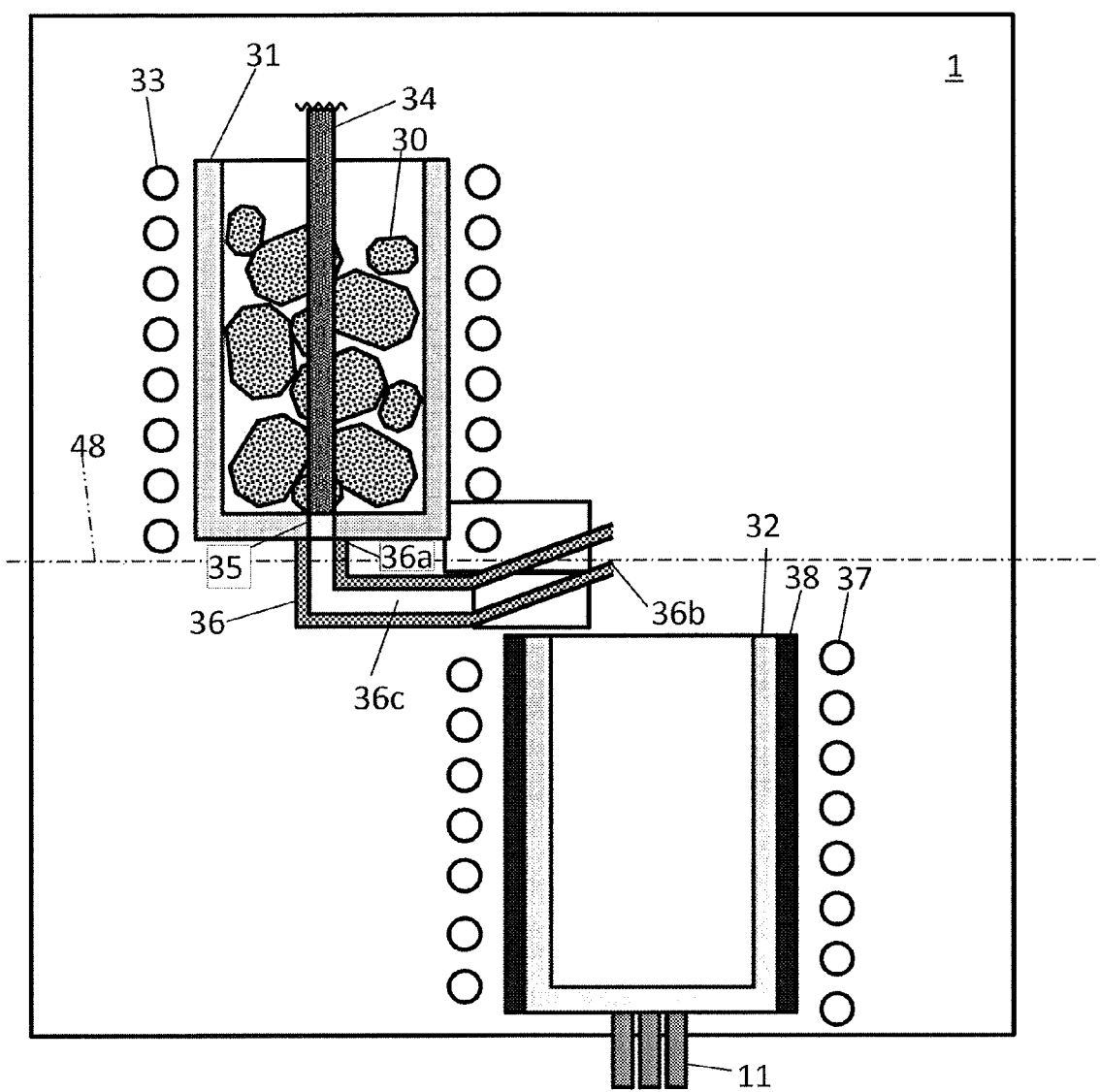
FIG. 7 is an internal configuration diagram of a melting chamber 1 according to a fourth embodiment.

FIG. 7 is an internal configuration diagram of the melting chamber 1 according to the fourth embodiment of the present invention, and depicts a state before melting the material to be melted 30 in the first crucible 31.

The present embodiment differs from the first embodiment in that (1) the first crucible 31 is held above the second crucible 32, and the second end portion 36b of the introduction pipe 36 is opened above the second crucible 32.

In the present embodiment, similarly to the third embodiment, the level of the flow path of the introduction pipe 36 is monotonously lowered from the first end portion 36a to the lowest portion 36c, and thereafter, from the lowest portion 36c to the second end portion 36b, the level is kept constant in the horizontal pipe portion and then monotonically rises.

In the case where the metal powder production apparatus is configured as described above, the tapping of the liquid 7 ends when the liquid level of the liquid 7 drops to the level position 48 of the lower end of the second end portion 36b. That is, even if the stopper 34 is raised and kept away from the first opening 35, since the tapping of the liquid 7 stops when the liquid level of the liquid 7 coincides with the level position 48 of the lower end of the second end portion 36b, the oxide 40 in the first crucible 31 does not pass through the introduction pipe 36 and enter the second crucible 32.

Therefore, also in the metal powder production apparatus of the present embodiment, it is possible to prevent the oxide 40 generated at the time of generation of the liquid 7 from being mixed into the second crucible 32 and the liquid nozzle 11, and it is possible to efficiently produce the metal powder of high purity. In particular, since the present embodiment has a simple structure in which it is unnecessary to connect both the first crucible 31 and the second crucible 32 by the introduction pipe 36, it is advantageous in that manufacturing is easier than that of the first embodiment.

The introduction pipe 36 depicted in FIG. 7, that is, the introduction pipe 36 having the upward slope portion in which the level of the flow path monotonously rises on the downstream side of the lowest portion 36c in the flow direction of the liquid 7, may be replaced with the introduction pipe 36 depicted in FIG. 5, that is, the introduction pipe 36 having the horizontal portion in which the level of the flow path is kept constant on the downstream side of the lowest portion 36c in the flow direction of the liquid 7.

Fifth Embodiment

Figure 8:
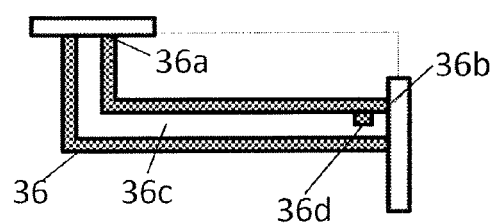
FIG. 8 is a cross-sectional view of the introduction pipe 36 according to the fifth embodiment.
Figure 9:
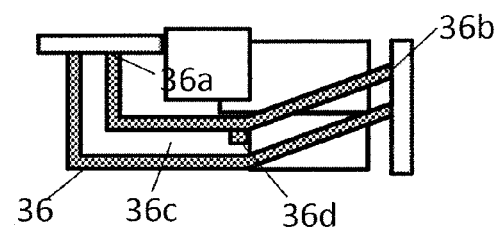
FIG. 9 is a cross-sectional view of an introduction pipe 36 according to the fifth embodiment.

FIGS. 8 and 9 are cross-sectional views of the introduction pipe 36 according to the fifth embodiment of the present invention. The introduction pipe 36 of the first, second, third, and fourth embodiments is preferably provided with a floating matter collecting wall 36d protruding downward from the upper portion of the inner wall of the flow path of the introduction pipe 36.

For example, when the momentum of the tapping of the liquid from the liquid nozzle 11 is strong, since the flow velocity of the liquid in the introduction pipe 36 increases, the possibility that the oxide 40 enters the second crucible 32 increases. However, if the floating matter collecting wall 36d is provided in the introduction pipe 36 as in the present embodiment, the oxide 40 can be collected by the floating matter collecting wall 36d while moving toward the second end portion 36b, i.e., the second crucible 32, while floating in the introduction pipe 36. That is, the oxide 40 can be prevented from entering the second crucible 32.

It is preferable that the floating matter collecting wall 36d is provided in a portion close to the second end portion 36b. That is, in the example in which the horizontal pipe portion is provided as depicted in FIG. 8, the floating matter collecting wall 36d is preferable to provide it in the vicinity of the second end portion 36b, and in the example in which the upward slope portion in which the level of the flow path monotonously rises on the downstream side of the lowest portion 36c in the flow direction of the liquid 7 is provided as depicted in FIG. 9, it is preferable to provide the floating matter collecting wall 36d in the start portion of the upward slope portion, in other words, the end portion of the horizontal pipe portion.

As the floating matter collecting wall 36d, for example, when a cross-section of the introduction pipe 36 viewed in an axial direction thereof is circular, an arcuate plate in which an arc portion is in contact with the inner wall surface thereof may be used, or a throttle shape such as an orifice having a wall surface not only at the upper portion but also at the right and left portions and at the lower portion of the cross-section of the flow path may be used.

Sixth Embodiment

Figure 10:
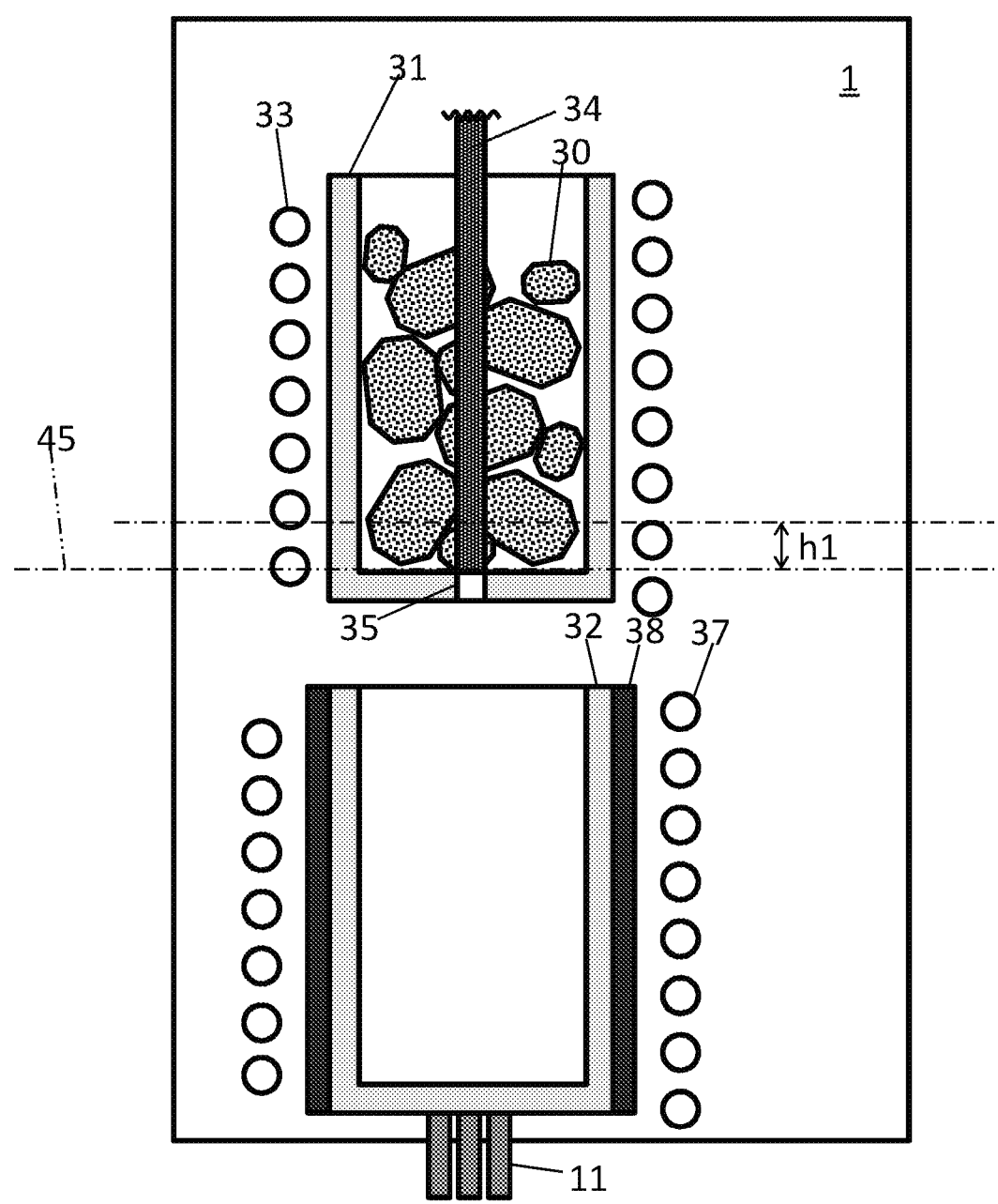
FIG. 10 is an internal configuration diagram of a melting chamber 1 according to a sixth embodiment.

FIG. 10 is an internal configuration diagram of the melting chamber 1 according to the sixth embodiment of the present invention, and depicts a state before melting the material to be melted 30 in the first crucible 31.

The present embodiment differs from the first embodiment mainly in (1) that the lower end of the first opening 35 corresponding to the second end portion 36b of the introduction pipe 36 is opened above the second crucible 32, and (2) that the second crucible 32 is installed below the first crucible 31.

When the metal powder production apparatus is configured as described above, the oxide 40 in the first crucible 31 can be prevented from entering the second crucible 32 while the liquid surface of the liquid 7 in the first crucible 31 is positioned above the level position 45 of the upper end of the first opening 35, i.e., the bottom surface of the first crucible 31, in other words, while the oxide 40 in the first crucible 31 floats in the vicinity of the liquid surface of the liquid 7. That is, it is preferable to lower the stopper 34 in a state in which the liquid level of the liquid 7 is positioned above the level position 45.

The metal powder production apparatus may be configured such that the stopper 34 is lowered at a timing when the liquid level of the liquid 7 is lowered to a position obtained by adding a predetermined height hi to the level position 45 of the upper end of the first opening 35, i.e., the bottom surface of the first crucible 31. The height hi is preferably determined based on the liquid level of the liquid at which the oxide 40 can float in the vicinity of the liquid surface of the liquid 7.

Seventh Embodiment

Figure 11:
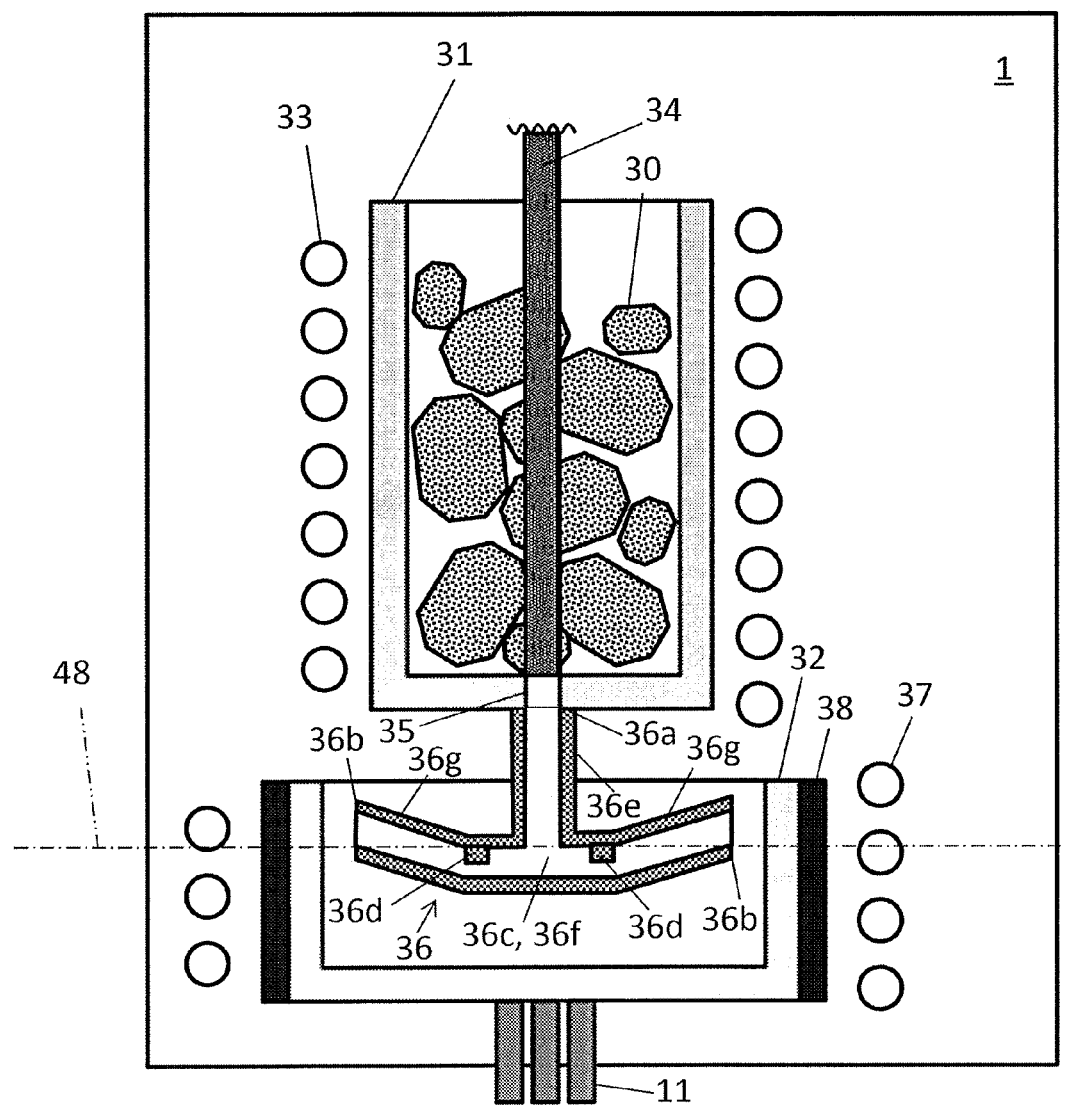
FIG. 11 is an internal configuration diagram of a melting chamber 1 according to a seventh embodiment.

FIG. 11 is an internal configuration diagram of the melting chamber 1 according to the seventh embodiment of the present invention, and depicts a state before melting the material to be melted 30 in the first crucible 31.

The main features of the present embodiment are: (1) the second crucible 32 is located below the first crucible 31; (2) the introduction pipe 36 includes a main pipe 36e that is substantially vertical and two branch pipes 36g that branch from the main pipe 36e to the left and right; (3) the ends of the two branch pipes 36g corresponding to the second end portions 36b are open ends that open inside the second crucible 32; and (4) the levels of the two open ends (the second end portions 36b) are higher than the level of the lowest portion 36c of the introduction pipe 36 (the branch portion 36f that branches the main pipe 36e into the two branch pipes 36g). Hereinafter, the details of the introduction pipe 36 will be mainly described.

The introduction pipe 36 includes a main pipe 36e having one end (a first end portion 36a) connected to the first opening 35 of the first crucible 31, two branch pipes 36g branching from the main pipe 36e and opening in the second crucible 32, and a branch portion 36f branching from the main pipe 36e to the two branch pipes 36g. The main pipe 36e is a substantially vertical pipe connecting the first opening 35 of the first crucible 31 and the branch portion 36f. The connecting portion of the main pipe 36e connected to the first opening 35 of the first crucible 31 is the first end portion 36a which is one end of the introduction pipe 36. The main pipe 36e and the two branch pipes 36g are connected to the branch portion 36f, and the lowest portion 36c having the lowest level in the flow path in the introduction pipe 36 is included in the branch portion 36f. Each of the two branch pipes 36g has an upward slope in which the level of the flow path monotonically rises from the connection portion with the branch portion 36 toward the second end portion 36b, and opens in the second crucible 32. The open end of the branch pipe 36g is the second end portion 36b which is the other end of the introduction pipe 36, and the level of the second end portion 36b is higher than the level of the lowest portion 36c of the introduction pipe 36. In addition, as depicted in the drawing, the floating matter collecting wall 36d depicted in FIGS. 8 and 9 may be provided at the connection portion with the branch pipe 36g in the branch portion 36f.

In the present embodiment, similarly to the third and fourth embodiments, the level of the flow path of the introduction pipe 36 is monotonously lowered from the first end portion 36a to the lowest portion 36c, and thereafter, from the lowest portion 36c to the second end portion 36b, the level is kept constant in the horizontal pipe portion and then monotonically rises.

When the metal powder production apparatus is configured as described above, the pouring of the liquid 7 into the second crucible 32 ends when the liquid level of the liquid 7 drops to the level position 48 of the lower end of the second end portion 36b. That is, even if the stopper 34 is raised and kept away from the first opening 35, since the pouring of the liquid 7 into the second crucible 32 is stopped at the point in time when the liquid level of the liquid 7 coincides with the level position 48 of the lower end of the second end portion 36b, the oxide 40 in the first crucible 31 does not enter the second crucible 32 as in the sixth embodiment.

Therefore, also in the metal powder production apparatus of the present embodiment, it is possible to prevent the oxide 40 generated at the time of generation of the liquid 7 from being mixed into the second crucible 32 and the liquid nozzle 11, and it is possible to efficiently produce the metal powder of high purity.

The introduction pipe 36 may be branched into three or more branch pipes, or a pipe having no branch like the introduction pipe 36 of the fourth embodiment may be used as the introduction pipe 36 of the present embodiment.

<Other>

The present invention is not limited to the embodiments described above, but includes various modifications within a range not deviating from the gist thereof. For example, the present invention is not limited to those having all the configurations described in the above embodiments, and includes those in which a part of the configurations is deleted. In addition, it is possible to add or replace a part of the configuration according to one embodiment to the configuration according to another embodiment.

In each of the embodiments described above, the case where two liquid nozzles 11 are provided on the bottom surface of the second crucible 32 has been described, but the number of liquid nozzles 11 provided on the bottom surface of the second crucible 32 is not limited to two, and may be one or three or more. In this case, the plurality of gas jet nozzles 2 are provided around each of the liquid nozzles 11, and the gas fluid is ejected to the molten metal flowing down from each of the liquid nozzles 11.

In each of the above-described embodiments, the first crucible 31 is wound with the high-frequency heating coil, or first heating device, 33 to melt the material to be melted 30, but a configuration in which molten metal melted by another crucible or the like is poured into the first crucible 31 may be adopted. However, in this case, it is preferable to add a configuration in which the first crucible 31 is preheated in the same manner as the second crucible 32, for example, carbon 38.

In addition, the case that a gas (a gas fluid) is jetted from the gas jet nozzles 2A and 2B is described above, but a liquid such as water may be jetted from the gas jet nozzles 2A and 2B. That is, there is a possibility that the present invention can be applied to any nozzle that ejects a fluid.

What is claimed is:

1. A metal powder production apparatus comprising:
    a first crucible capable of receiving a metal before melting;
    a first heating coil for heating and melting the metal in the first crucible;
    a stopper for opening and closing a first opening provided on a bottom surface of the first crucible;
    an introduction pipe having one end connected to the first opening of the first crucible, the introduction pipe guiding a molten metal in the first crucible to outside of the first crucible;
    a second crucible for receiving the molten metal flowing out of the introduction pipe;
    a second heating coil for heating the second crucible,
    a liquid nozzle provided on a bottom surface of the second crucible; and
    a plurality of gas jet nozzles arranged around the liquid nozzle and jetting a gas fluid to the molten metal flowing down from the liquid nozzle, wherein
    a level of a lowest portion having a lowest level in a flow path in the introduction pipe is lower than a level of an other end of the introduction pipe.

2. The metal powder production apparatus according to claim 1, wherein
    the second crucible comprises a second opening provided on either one of the bottom surface and a side surface of the second crucible, and
    the other end of the introduction pipe is connected to the second opening.

3. The metal powder production apparatus according to claim 2, wherein
    the introduction pipe has a floating matter collecting wall protruding downward from an upper portion of an inner wall of a flow path of the introduction pipe.

4. The metal powder production apparatus according to claim 1, wherein
    the other end of the introduction pipe is open above the second crucible.

5. The metal powder production apparatus according to claim 4, wherein
    the introduction pipe has a floating matter collecting wall protruding downward from an upper portion of an inner wall of a flow path of the introduction pipe.

6. The metal powder production apparatus according to claim 1, wherein
    the other end of the introduction pipe is open inside the second crucible, and
    a level of a lowest portion having a lowest level in a flow path in the introduction pipe is lower than a level of the other end of the introduction pipe.

7. The metal powder production apparatus according to claim 1, wherein
    the introduction pipe includes a main pipe having the one end of the introduction pipe, a plurality of branch pipes branching from the main pipe and opening in the second crucible, and a branch portion where the main pipe branches into the plurality of branch pipes,
    the branch portion is provided at a position having the lowest level in the flow path in the introduction pipe, and
    a level of an open end of each of the plurality of branch pipes is higher than a level of the branch portion.

8. The metal powder production apparatus according to claim 7, wherein
    the introduction pipe has a floating matter collecting wall protruding downward from an upper portion of an inner wall of a flow path of the introduction pipe.

9. The metal powder production apparatus according to claim 1, wherein the liquid nozzle is a plurality of liquid nozzles provided on the bottom surface of the second crucible, the plurality of gas jet nozzles are arranged around each of the plurality of liquid nozzles, and jetting a gas fluid to the molten metal flowing down from the plurality of liquid nozzles.

\* \* \* \* \*